US009464926B2

(12) United States Patent
Smith et al.

(10) Patent No.: US 9,464,926 B2
(45) Date of Patent: Oct. 11, 2016

(54) MAGNETIC FLOWMETER FLOWTUBE ASSEMBLY WITH SPRING-ENERGIZED SEAL RINGS (71) Applicant: Rosemount Inc., Chanhassen, MN (US)

(72) Inventors: Joseph A. Smith, Minneapolis, MN (US); Erik D. Anderson, Bloomington, MN (US); Michael J. Mikolichek, Farmington, MN (US); Steven B. Rogers, Minnetonka, MN (US)

(73) Assignee: MICRO MOTION, INC., Boulder, CO (US)

( * ) Notice: Subject to any disclaimer, the term of this patent is extended or adjusted under 35 U.S.C. 154(b) by 0 days.

(21) Appl. No.: 14/493,936

(22) Filed: Sep. 23, 2014

(65) Prior Publication Data
US 2016/0084689 A1 Mar. 24, 2016

(51) Int. Cl.
G01F 1/58 (2006.01)
(52) U.S. Cl.
CPC ............... G01F 1/584 (2013.01); G01F 1/588 (2013.01)

(58) Field of Classification Search
None
See application file for complete search history.

(56) References Cited

U.S. PATENT DOCUMENTS

| 4,345,464 | A | 8/1982 | Herzl et al. | |
|---|---|---|---|---|
| 5,526,698 | A | 6/1996 | Sakurai et al. | |
| 5,577,472 | A | 11/1996 | Banta, III et al. | |
| 5,938,246 | A * | 8/1999 | Wallace | F16L 23/18 277/314 |
| 7,178,407 | B2 * | 2/2007 | Kappertz | G06F 1/588 73/861.11 |
| 7,823,461 | B2 * | 11/2010 | Kappertz | G06F 1/58 73/861.12 |
| 7,895,902 | B2 * | 3/2011 | Iijima | G06F 1/58 73/861.11 |
| 7,938,020 | B2 | 5/2011 | Diederichs | |
| 8,082,803 | B2 * | 12/2011 | Iijima | G06F 1/58 73/861.11 |
| 2006/0213284 | A1 * | 9/2006 | Visser | G01F 1/586 73/861.12 |
| 2006/0220324 | A1 * | 10/2006 | Anderson | F16J 15/064 277/606 |
| 2007/0163360 | A1 * | 7/2007 | Baecker | G06F 1/58 73/861.12 |
| 2007/0193366 | A1 * | 8/2007 | Backer | G06F 1/588 73/861.12 |
| 2008/0236899 | A1 * | 10/2008 | Oxford | E21B 10/18 175/339 |
| 2009/0188327 | A1 * | 7/2009 | Shanahan | G01F 15/185 73/861.08 |
| 2009/0243290 | A1 * | 10/2009 | Anderson | F16L 23/18 285/343 |

(Continued)

FOREIGN PATENT DOCUMENTS

JP 06-078820 U 11/1994

OTHER PUBLICATIONS

International Search Report and Written Opinion for International Application No. PCT/US2015/051004, date of mailing: Dec. 14, 2015, date of filing: Sep. 18, 2015, 19 pages.

(Continued)

Primary Examiner — Harshad R Patel
(74) Attorney, Agent, or Firm — Katherine M. Scholz; Kelly, Holt & Christenson, PLLC (57) ABSTRACT A magnetic flowmeter flowtube assembly includes a conduit with a first end and a second end. A first neck flange is coupled to the first end of the conduit and has an inside diameter with a first notch extending radially outwardly therefrom. A second neck flange is coupled to the second end and has an inside diameter with a second notch extending radially outwardly therefrom. A fluoropolymer liner is disposed within and extends through the first neck flange, the conduit and the second neck flange. A pair of electrodes is mounted relative to the liner to measure a voltage induced within a process fluid flowing through the liner. A first spring-energized seal ring is disposed in the first notch and a second spring-energized seal ring disposed in the second notch. A method of sealing a magnetic flowmeter having a fluoropolymer liner is also provided.

24 Claims, 12 Drawing Sheets (56) References Cited

U.S. PATENT DOCUMENTS

2010/0192700 A1    8/2010  Iijima
2010/0270086 A1*  10/2010  Matthews, III ......... E21B 10/00
                                                        175/425
2013/0305838 A1   11/2013  Mikolichek et al.
2016/0084690 A1    3/2016  Smith et al.

OTHER PUBLICATIONS

International Search Report and Written Opinion for International Application No. PCT/US2015/051009, date of mailing: Dec. 9, 2015, date of filing: Sep. 18, 2015, 13 pages.

* cited by examiner

MAGNETIC FLOWMETER FLOWTUBE ASSEMBLY WITH SPRING-ENERGIZED SEAL RINGS

BACKGROUND

Magnetic flowmeters (or mag meters) measure flow by Faraday induction, an electromagnetic effect. The magnetic flowmeter energizes one or more coils which generate a magnetic field across a section of a flowtube assembly. The magnetic field induces an electromotive force (EMF) across the flow of conductive process fluid through the flowtube assembly. The resulting potential developed across the conductive fluid is measured using a pair of electrodes that extends into the flowing process fluid. Alternatively, some magnetic flowmeters employ capacitive coupling between the electrodes and the process fluid such that the EMF can be measured without direct contact. In any event, the flow velocity is generally proportional to the induced EMF, and the volumetric flow is proportional to the flow velocity and the cross sectional area of the flowtube.

Magnetic flowmeters are useful in a variety of fluid flow measurement environments. In particular, the flow of water-based fluids, ionic solutions and other conducting fluids can all be measured using magnetic flowmeters. Thus, magnetic flowmeters can be found in water treatment facilities, beverage and hygienic food production, chemical processing, high purity pharmaceutical manufacturing, as well as hazardous and corrosive fluid processing facilities. Magnetic flow meters are often employed in the hydrocarbon fuel industry, which sometimes employs hydraulic fracturing techniques utilizing abrasive and corrosive slurries.

Magnetic flowmeters can be specified with a variety of different lining and/or electrode materials to suit the application for which the magnetic flowmeter is employed. Examples of lining materials include polytetrafluoroethylene (PTFE); ethylene tetrafluoroethylene (ETFE); PFA; polyurethane; neoprene; and linatex rubber, as well as other materials. Electrodes may be constructed from any suitable material including 316 L stainless steel; nickel alloy 276; tantalum; platinum/iridium blends; titanium; as well as other suitable materials.

Fluoropolymer lining materials such as PTFE, ETFE, and PFA are often selected for superior resistance to chemical attack and/or high temperature operation. In at least some applications, fluoropolymer-based liners are being subjected to increased application demands. For example, in the oil and gas industry, some fluoropolymer liners are being subjected to higher pressures and/or temperatures. Such conditions create a challenge in designing and manufacturing robust magnetic flowmeter devices with fluoropolymer liners. This is because at least some fluoropolymers, such as PTFE, experience "cold flow" where the lining material expands and contracts under pressure and temperature. Such expansion/contraction can cause the process fluid to leak. Providing a magnetic flowmeter with a fluoropolymer liner and improved sealing against process fluid leakage would allow such fluoropolymer liners to be used for increased pressure and temperature applications.

SUMMARY

A magnetic flowmeter flowtube assembly includes a conduit with a first end and a second end. A first neck flange is coupled to the first end of the conduit and has an inside diameter with a first notch extending radially outwardly therefrom. A second neck flange is coupled to the second end and has an inside diameter with a second notch extending radially outwardly therefrom. A fluoropolymer liner is disposed within and extends through the first neck flange, the conduit and the second neck flange. A pair of electrodes is mounted relative to the liner to measure a voltage induced within a process fluid flowing through the liner. A first spring-energized seal ring is disposed in the first notch and a second spring-energized seal ring disposed in the second notch. A method of sealing a magnetic flowmeter having a fluoropolymer liner is also provided. A magnetic flowmeter flowtube assembly with electrode assemblies having spring-energized seals is also provided.

DETAILED DESCRIPTION OF ILLUSTRATIVE EMBODIMENTS

Figure 1:
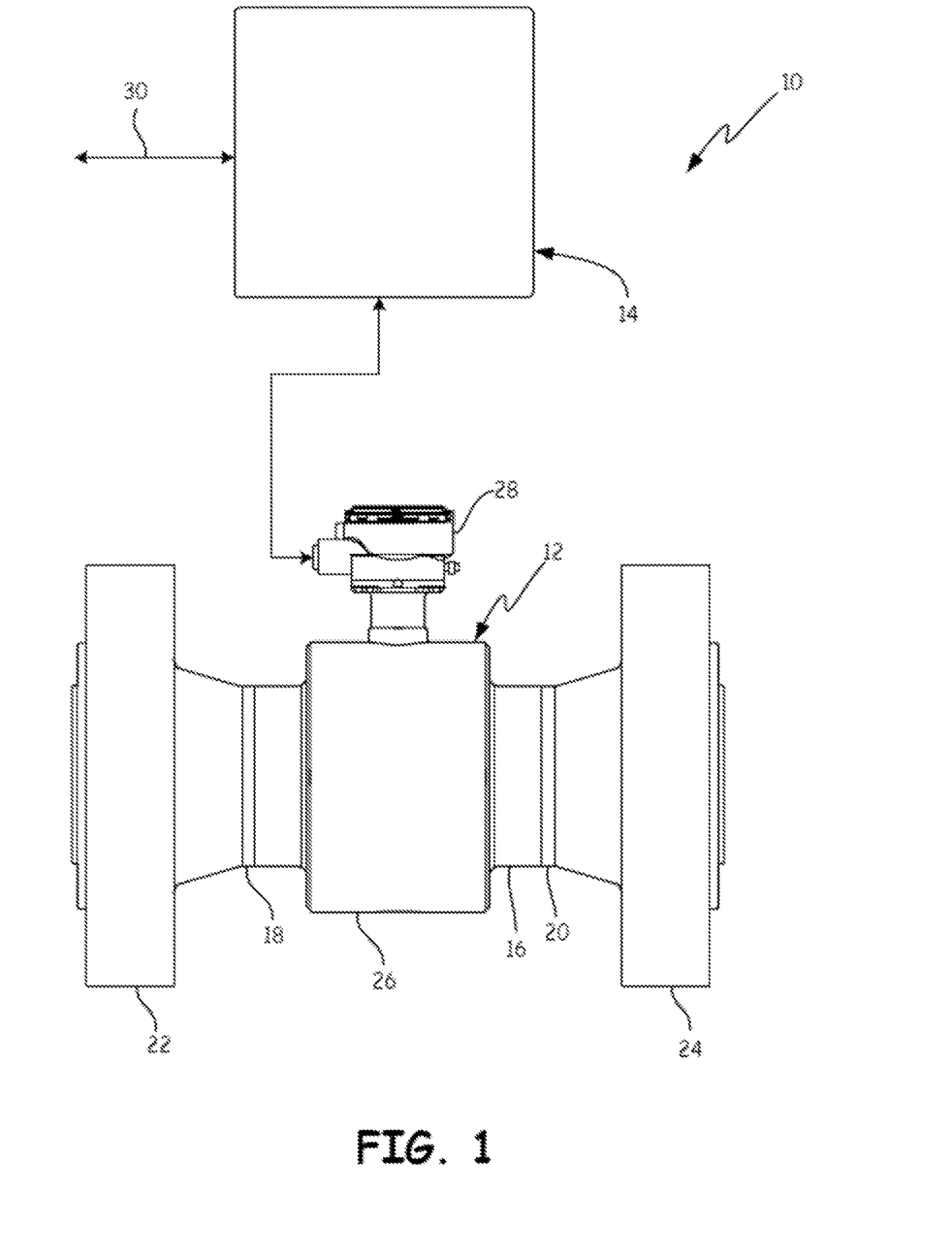
FIG. 1 is a diagrammatic view of a magnetic flowmeter with which embodiments of the present invention are particularly useful.

FIG. 1 is a diagrammatic view of a magnetic flowmeter with which embodiments of the present invention are particularly useful. Magnetic flowmeter 10 includes flowtube assembly 12 coupled to transmitter electronics 14. Flowtube assembly 12 includes a section of conduit 16 having ends 18 and 20 coupled to respective weld neck flanges 22 and 24. Each of weld neck flanges 22, 24 includes mounting holes for mounting to suitable pipe flanges such that process fluid flows through conduit 16. Weld neck flanges 22, 24 generally attach to conduit 16 by welding conduit 16 to a neck of the weld neck flange. Such coupling allows for the transfer of stress from the weld neck flange 22, 24 to conduit 16. Weld neck flanges are typically used for high pressure applications.

Flowtube assembly 12 also generally includes a coil/electrode portion 26 that contains one or more electromagnetic coils driven by transmitter electronics 14 to generate and electromagnetic field across conduit 16. Electrodes disposed within conduit 16 contact the process fluid and are used to sense the electromotive force (EMF) generated across the process fluid in response to the induced magnetic field. The coil(s) and electrodes of flowtube assembly 12 are generally coupled to a terminal block within housing 28, which is then operably coupled to transmitter electronics 14. Transmitter electronics 14 generally includes a controller or microprocessor that is configured to provide an indication of process fluid flow based on the measured EMF. Transmitter electronics 14 also generally includes communication circuitry to convey such process fluid flow information to one or more remote devices as indicated by bi-directional arrow 30. Such communication can be in the form of wired process communication or wireless process communication.

Figure 2:
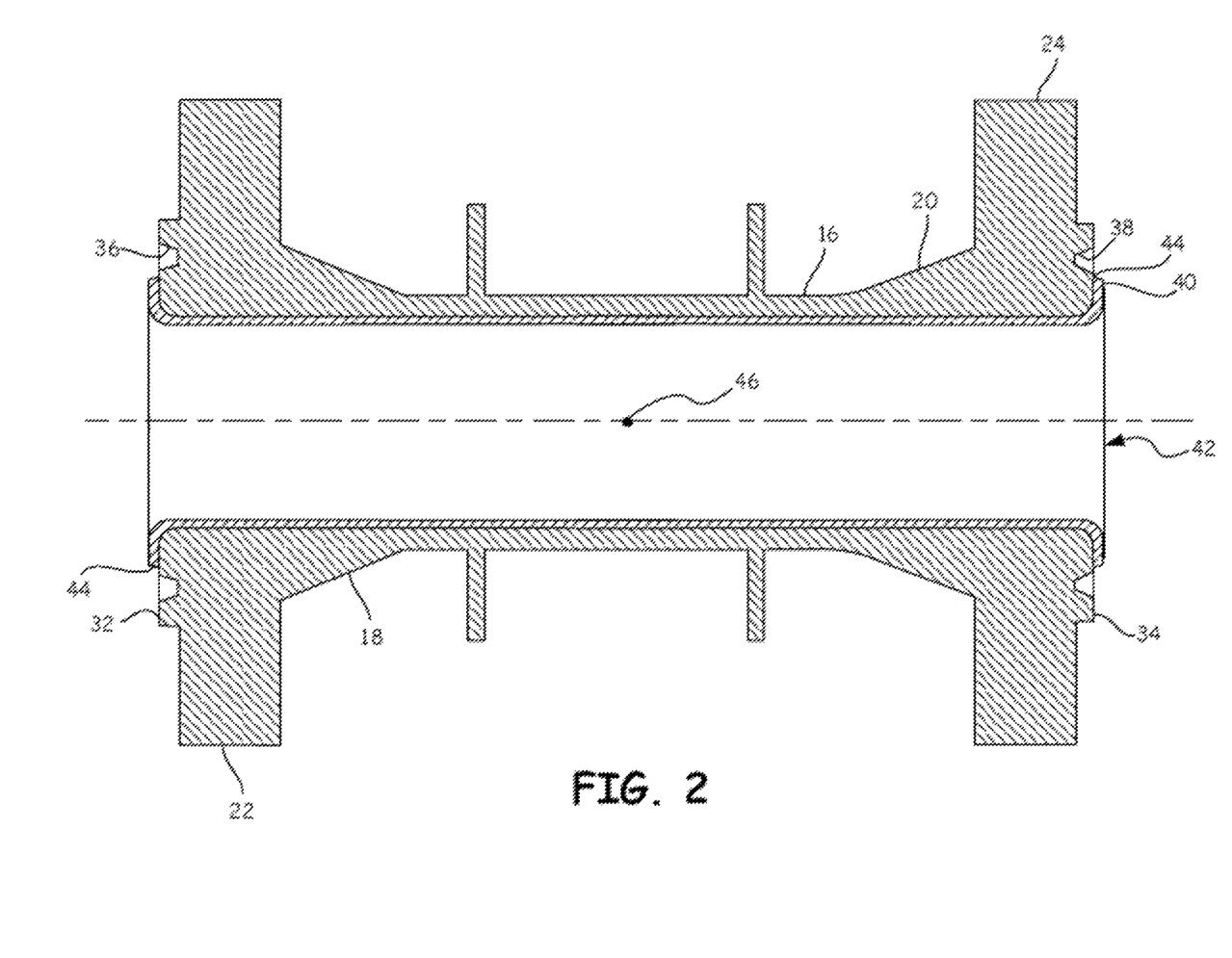
FIG. 2 is a diagrammatic cross-sectional view illustrating a fluoropolymer liner disposed within a flowtube assembly having a pair of weld neck flanges.

FIG. 2 is a diagrammatic cross-sectional view illustrating a fluoropolymer liner disposed within a conduit that is coupled to a pair of weld neck flanges. Each of flanges 22, 24 includes a sealing face 32, 34, respectively, that is configured to engage a seal ring and thereby fluidically couple to an opposing pipe flange. In some cases, the seal may be a ring-type seal which is received in grooves 36, 38 in order to generate a high-pressure metal-to-metal connection. While the utilization of an RTJ sealing ring provides a robust seal, it also creates a gap between outside diameter 40 of liner 42 and the inside diameter of the sealing ring. This gap allows the pressurized process fluid to engage or otherwise contact interface 44 between the fluoropolymer liner 42 and the weld neck flanges 22, 24. Generally, liner 42 is interference fit into the inside diameter of conduit 16, and thus there is no bond between liner 42 and conduit 16. Under some cold flow conditions, liner 42 will expand or contract and can generate leak paths at the flange faces. Once process fluid breaches interfaces 44, it can move along the inside diameter of conduit 16 to reach electrodes 46 very quickly. When the process fluid reaches the electrodes, electrical isolation of such electrodes is defeated and the electrodes are no longer able to carry the induced voltage from the process fluid to transmitter electronics 14.

Embodiments of the present invention generally provide a robust seal on both upstream and downstream sides of the electrodes such that if process fluid should breach interfaces 44, that such leaking process fluid will not reach either of the electrodes 46. Additionally or alternatively, embodiments of the present invention may also provide robust seals around each electrode assembly.

Figure 3:
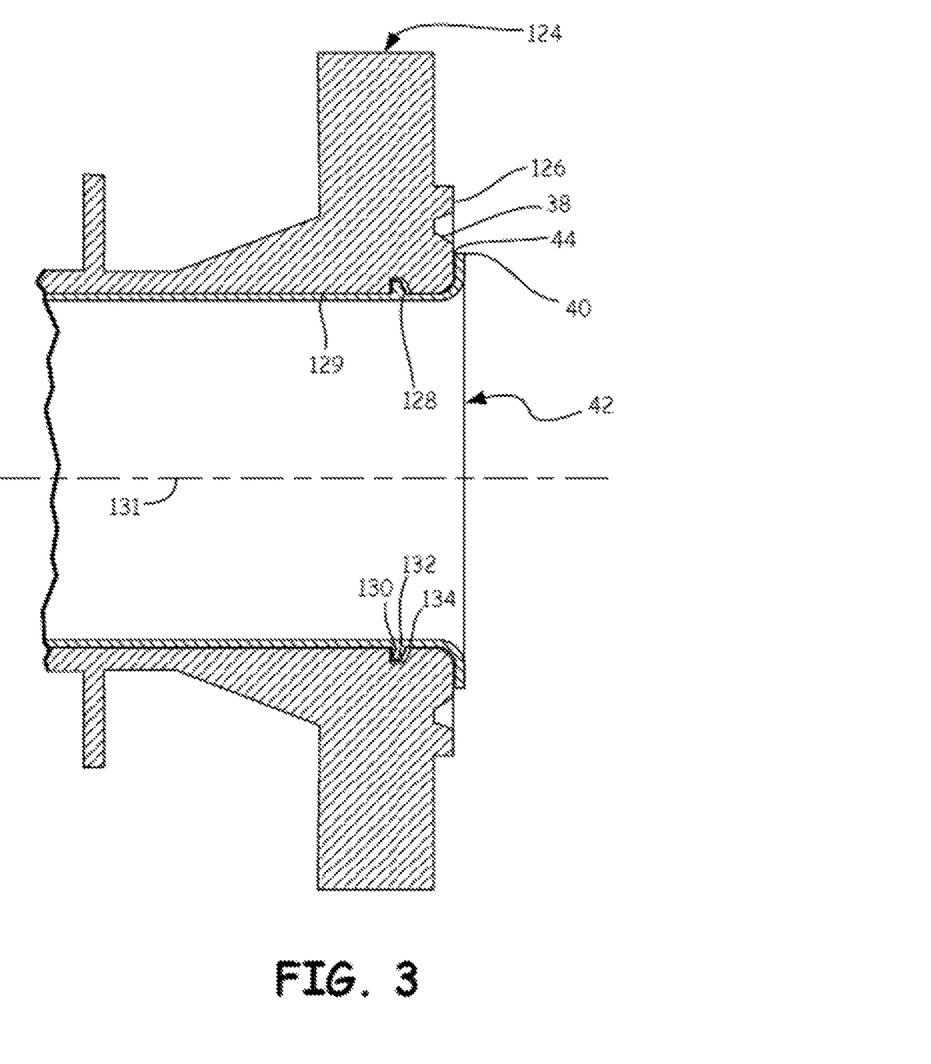
FIG. 3 is a diagrammatic cross-sectional view of a portion of a weld neck flange in accordance with an embodiment of the present invention.

FIG. 3 is a diagrammatic cross-sectional view of a weld neck flange having a seal notch in accordance with an embodiment of the present invention. Weld neck flange 124 is similar to weld neck flange 24 (shown in FIG. 2) in that it includes a raised face 126 and RTJ groove 38. Further still, an interface 44 is provided between outside diameter 40 of liner 42 and face 126 of weld neck flange 124. Accordingly, process fluid, in some situations, may breach interface 44. However, weld neck flange 124 includes a notch 128 machined or otherwise created extending radially outwardly from inside diameter 129. In the embodiment illustrated in FIG. 3, notch 128 includes a first surface 130 extending substantially perpendicularly outwardly from axis 131 of weld neck flange 124. Notch 128 also includes an outer surface 132 that, in the embodiment illustrated in FIG. 3, meets surface 130 at a substantially right angle. Finally, in the embodiment illustrated in FIG. 3, notch 128 also includes an angled surface 134 disposed opposite surface 130. The angled surface 134 helps receive a spring-energized seal (shown in FIG. 4). Once the seal is in place, surface 130 provides a robust seat such that the pressure of the process fluid acting against the seal cannot displace it. Embodiments of the present invention generally provide notch 128 within the inside diameter of the weld neck flange since placing a seal on face 126 of weld neck flange 124 would present problems due to movement of liner 42 in that area as well as the static pressure caused by the clamping load.

Figure 4:
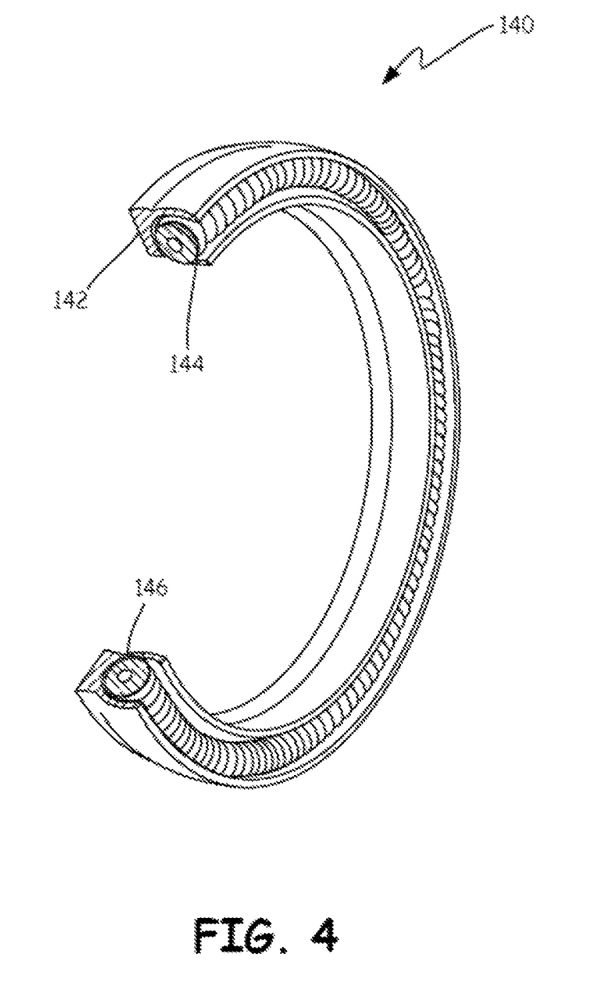
FIG. 4 is a partial diagrammatic perspective view of a spring-energized seal useful with embodiments of the present invention.

FIG. 4 is a partial diagrammatic perspective view of a spring-energized seal that is configured to be received within notch 128 (shown in FIG. 3) to inhibit process fluid that breaches interface 44 (shown in FIG. 3) from reaching electrodes 46. Spring-energized seal 140 generally includes a face 142 that abuts against surface 130 (shown in FIG. 3). Seal 140 also includes a U-shaped portion 144 that has an opening sized to receive a metal spring 146 therein. In the embodiment shown in FIG. 4, metal spring 146 is a coil spring formed of 316L stainless steel. Additionally, while only a portion of spring-energized seal 140 is shown in FIG. 4, such depiction is intended to illustrate a cross-section of the seal and it is understood that an entire continuous seal is provided. In some embodiments, the materials of spring-energized seal 140 are selected to match materials already present within the flowtube assembly. For example, if liner 42 is constructed from PTFE, then, portions 142 and 144 may also constructed from PTFE. Additionally, if weld neck flange 124, or electrode 46, is constructed from stainless steel, then spring 146 may also be constructed from stainless steel. In this manner, a third wetted material is not introduced to the process, as these material types are already wetted. Spring 146 is open, by virtue of U-shaped portion 144, to leaking process fluid and thus takes on such process fluid, which causes expansion at the joint. The expansion closes off the path to electrode 46, even during cold flow conditions. In one embodiment, spring 146 is chamfered so that the insertion of liner 42 during manufacture or repair does not cause spring 146 to eject.

Figure 5:
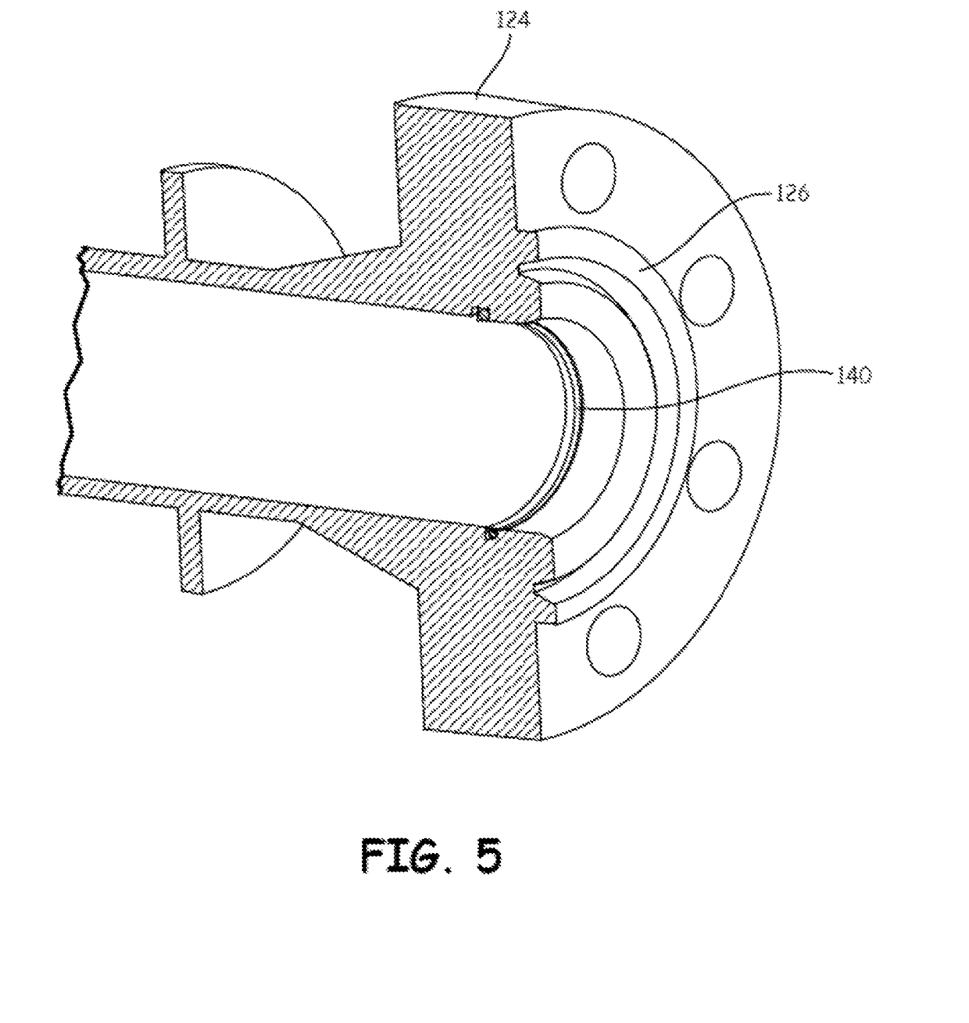
FIG. 5 is a diagrammatic view of weld neck flange having spring-energized seal mounted therein in accordance with an embodiment of the present invention.

FIG. 5 is a diagrammatic view of weld neck flange 124 having spring-energized seal 140 mounted therein. In FIG. 5, liner 42 is removed for illustration purposes. Spring 146 of seal 140 opens toward sealing face 126 of weld neck flange 124. This ensures that if the process fluid breaches interface 44 (shown in FIG. 2) that such process fluid will encounter spring 146 and thereby cause the expansion of seal 140 to inhibit any further process fluid flow toward the electrodes. This will create a virtually impenetrable barrier with the liner and will ensure that process fluid will not reach the electrodes and cause decreased flowmeter performance. Additionally, it is believed that embodiments of the present invention will generally allow the utilization of fluoropolymer liners at higher pressures thereby extending the usable range of pressures to which such chemically inert materials can be subjected. While embodiments of the present invention generally employ an interference fit between the liner and the flowtube/weld neck assembly, embodiments of the present invention can also employ chemical bonds between the flared fluoropolymer portion and the weld neck flange at or proximate interfaces 44 to create an additional high pressure seal.

Figure 6:
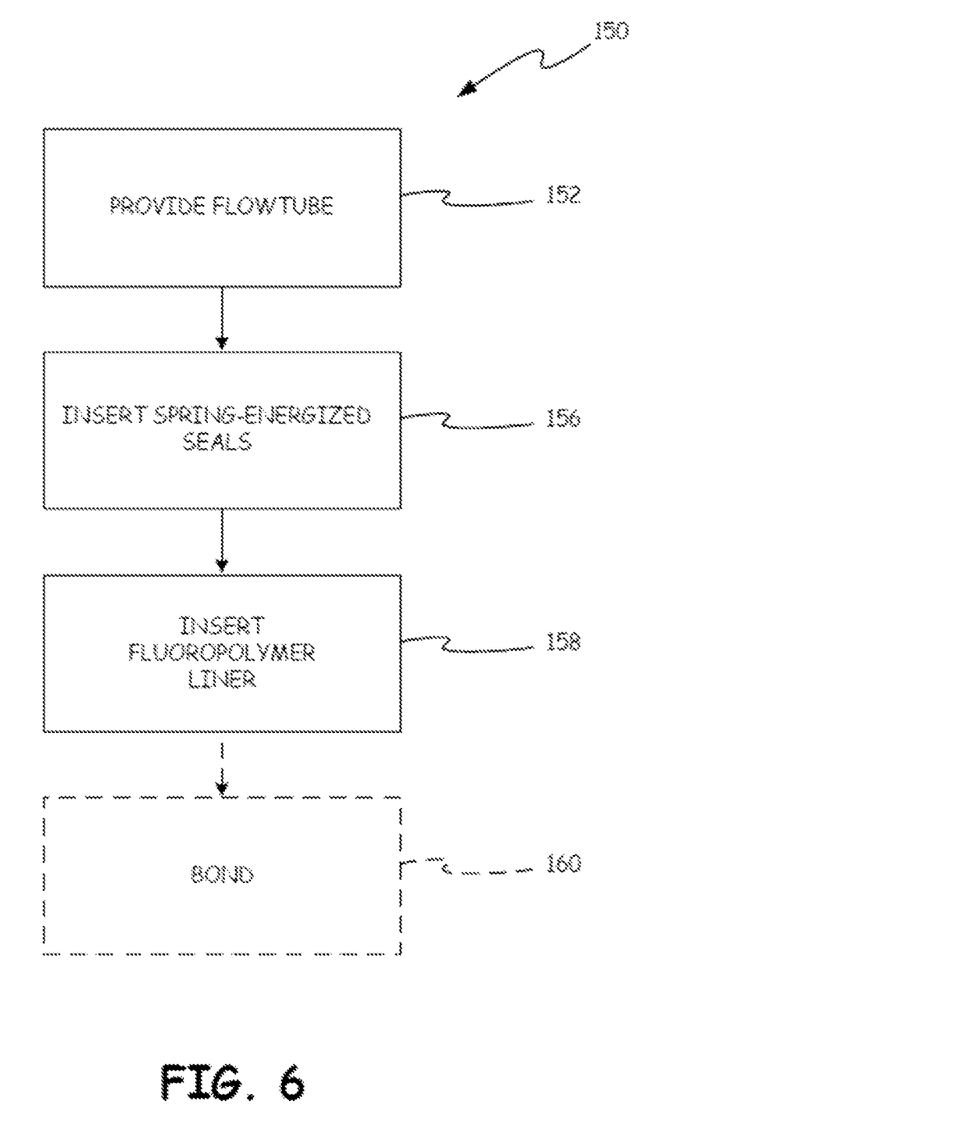
FIG. 6 is a flow diagram of a method of sealing a magnetic flowmeter having a fluoropolymer liner in accordance with an embodiment of the present invention.

FIG. 6 is a flow diagram of a method of sealing a magnetic flowmeter having a fluoropolymer liner in accordance with an embodiment of the present invention. Method 150 begins at block 152 where a flowtube assembly having a pair of weld neck flanges with internal notches is provided. Each of the notches extends outwardly from an inside diameter of the flowtube. These notches are sized and shaped to receive and maintain spring-energized seal rings, such as ring 140, therein. At block 156, a spring-energized seal ring, such as ring 140, is placed in each of the notches. The spring in each seal ring is, in some embodiments, chamfered to prevent the spring from being ejected during liner insertion. Each seal ring has an opening facing its nearest weld neck flange such that process fluid leaking past the weld neck flange/liner interface will enter the opening and cause spring within the seal to take on fluid to cause expansion at the seal. The expansion closes off the path to the electrode even during cold flow conditions. At block 158, the fluoropolymer liner is inserted into the flowtube. Optionally, block 160 can also be performed to chemically bond the fluoropolymer liner to the flowtube for additional sealing at the liner/flowtube interface(s).

Embodiments described thus far generally inhibit or otherwise block process fluid leakage that may occur near the mounting flanges from reaching the electrodes when a fluoropolymer liner undergoes cold flow. However, when the fluoropolymer liner undergoes cold flow, there are other areas of the flowtube assembly that may be susceptible to process fluid leakage. Specifically, known electrode assemblies that are used with such flowtube assemblies may experience process fluid leakage when used with a fluoropolymer liner that is susceptible to cold flow.

Figure 7:
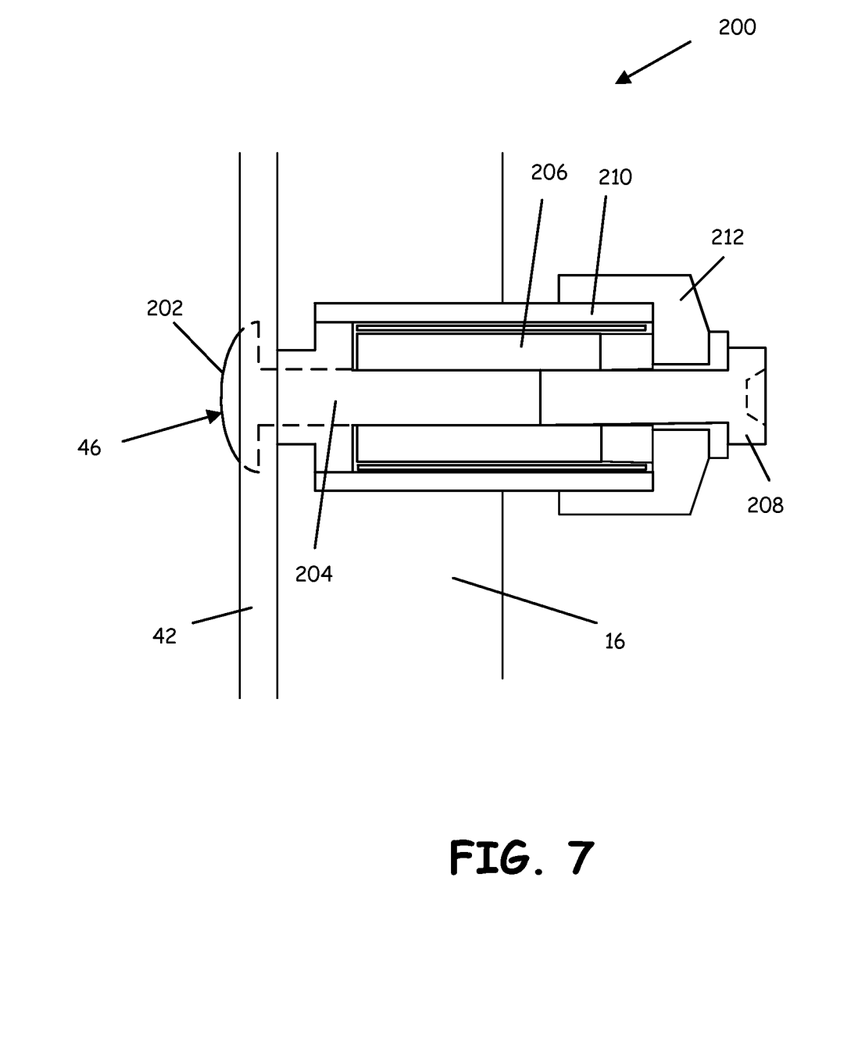
FIG. 7 is a diagrammatic view of a known electrode assembly for a magnetic flowmeter.

FIG. 7 is a diagrammatic view of a known electrode assembly for a magnetic flowmeter. Electrode assembly 200 comprises electrode 46 with head 202 and body 204, electrode retainer 206, external contact screw 208 and housing 210. A cap nut 212 is engaged on housing 210 in order to retain electrode head 202, body 204 and contact screw 208. A wire or other suitable connection is generally coupled to electrode assembly 200 proximate contact screw 208. This allows a robust coupling between electrode head 202 and the transmitter electronics 14. Electrode head 202 is disposed to contact the process fluid flowing through conduit 16. As shown in FIG. 7, during normal operation, electrode head 202 is at least partially sunken within fluoropolymer liner 42.

Figure 8:
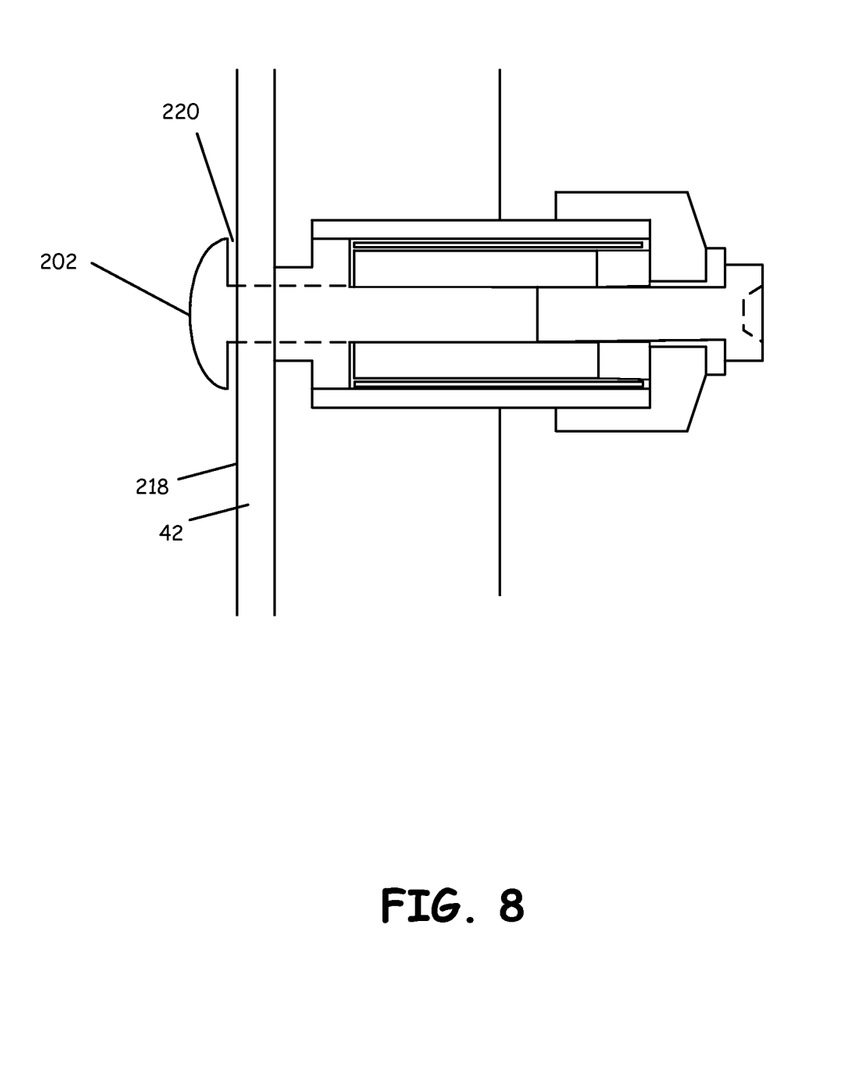
FIG. 8 is a diagrammatic view of the electrode assembly of FIG. 7 during cold flow of a fluoropolymer liner.

FIG. 8 is a diagrammatic view of the electrode assembly of FIG. 7 during cold flow of a fluoropolymer liner. FIG. 8 is similar to FIG. 7 but shows that during cold flow of liner 42, electrode head 202 can lift away from inner diameter 218 of fluoropolymer liner 42, which creates a gap 220 that can allow process fluid to leak.

Figure 9:
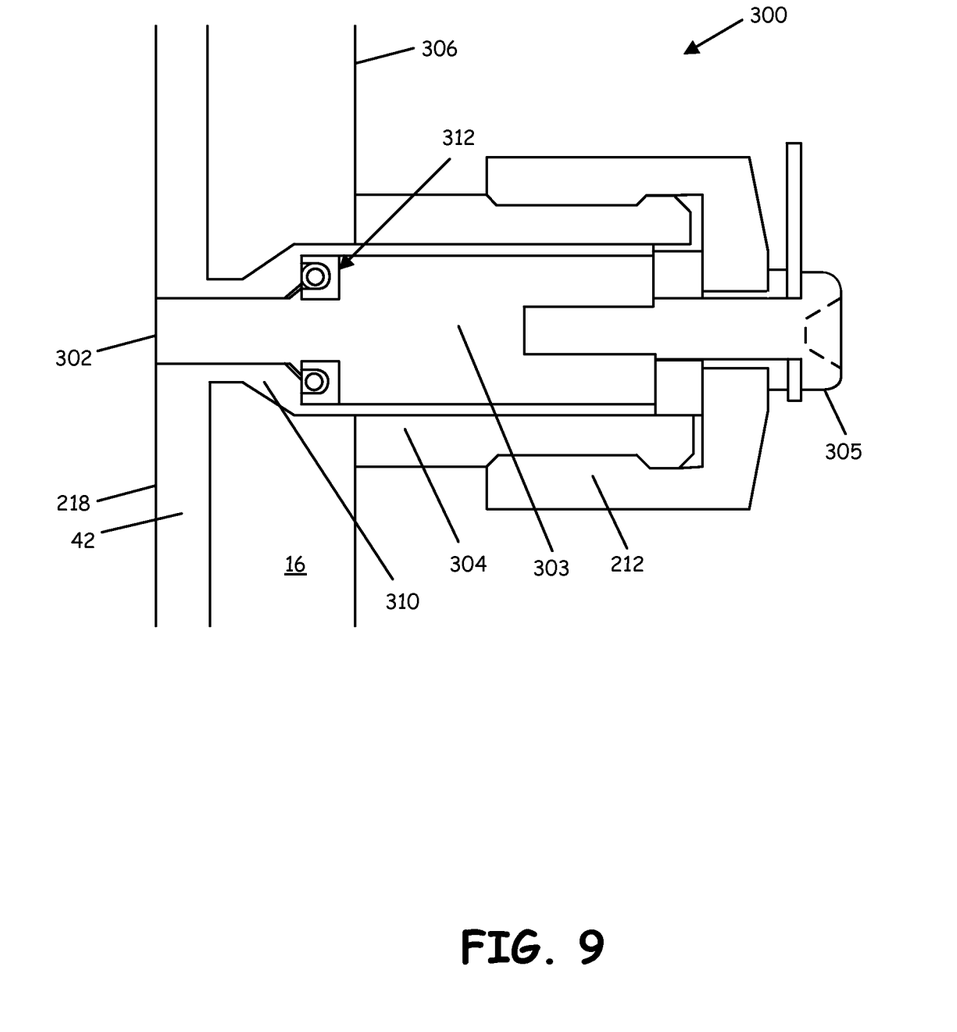
FIG. 9 is a diagrammatic view of an electrode assembly in accordance with an embodiment of the present invention.

FIG. 9 is a diagrammatic view of an electrode assembly in accordance with an embodiment of the present invention. Electrode assembly 300 comprises electrode head 302 that, in one embodiment, is press fit to be flush with inside diameter 218 of fluoropolymer liner 42. This helps reduce noise and particle buildup. Electrode head 302 is coupled to electrode extension 303 which extends within tunnel 304 and includes threaded receptacle for receiving screw 305. Tunnel 304 is, in one embodiment, metallic and is welded or otherwise attached to outside diameter 306 of conduit 16 at interface 308. Fluoropolymer cavity 310 is, in one embodiment, molded into conduit 16 and tunnel 304. Suitable examples of fluoropolymer for fluoropolymer cavity 310 include PFA and ETFE which may be molded into various shapes as desired. These shapes are used to direct flow toward spring-energized seal 312 and to prevent particles from entering the area between electrode head 302 and liner 42. Spring-energized seal 312 is formed of a spring that is fit into a jacket. When process fluid encounters spring-energized seal 312, the process fluid pressure acts on the inside of the jacket pressing it outwardly. This outward force helps increase the sealing ability of the seal. Thus, when spring-energized seal 312 is inserted into fluoropolymer cavity 310, a virtually impenetrable barrier is created between the electrode and the tunnel wall. When process fluid fills the cavity, pressure is applied to the electrode and tunnel walls via the spring, thereby containing the process fluid. The thin layer of fluoropolymer cavity 310 enables the reaction force necessary to seal, while also providing electrical isolation.

Figure 10:
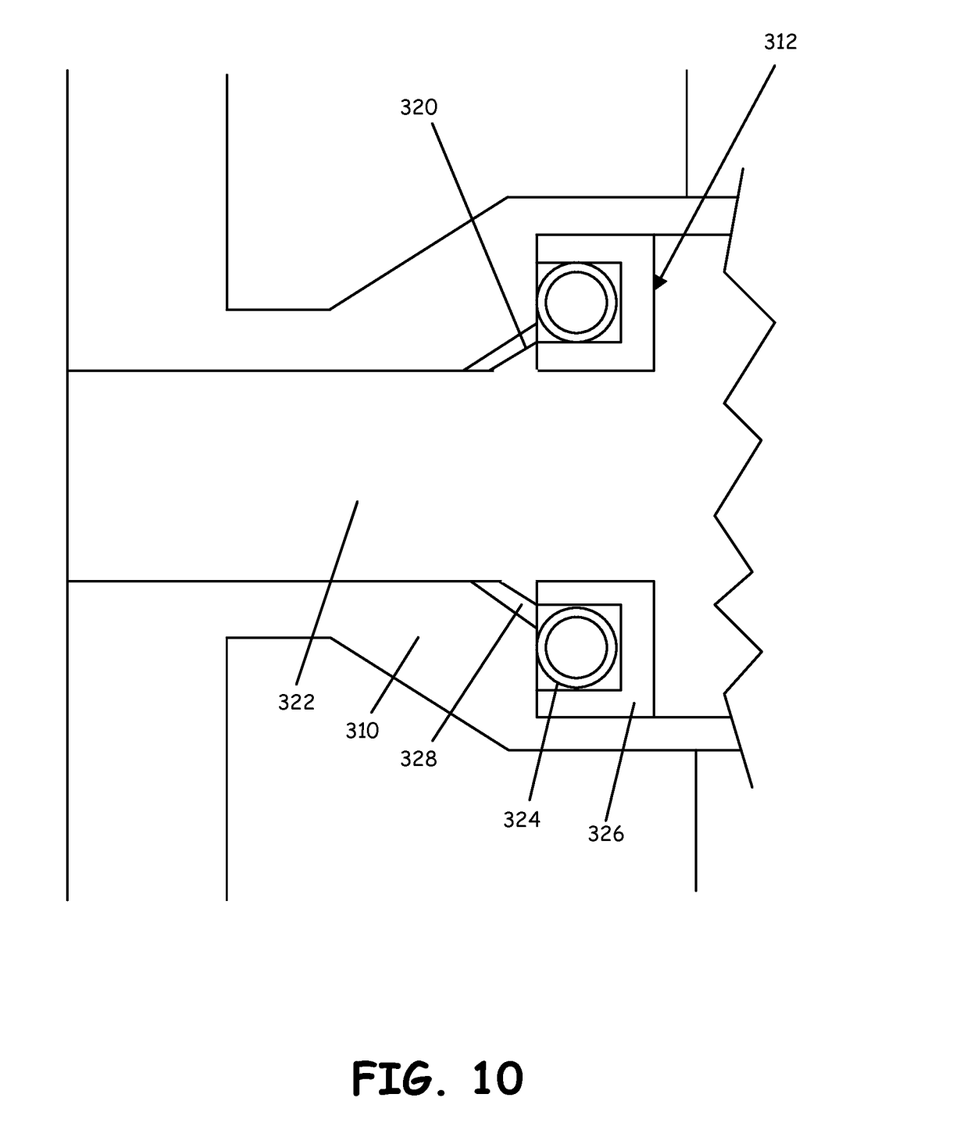
FIG. 10 is a diagrammatic view of a portion of an electrode assembly in accordance with an embodiment of the present invention.

FIG. 10 is a diagrammatic view of a portion of an electrode assembly in accordance with an embodiment of the present invention. Specifically, FIG. 10 illustrates spring-energized seal 312 being held in place by lip 320 on electrode 322. Additionally, FIG. 10 shows seal 312 being formed of spring 324 within jacket 326. In one embodiment, spring 324 is formed of 316 Stainless Steel and jacket 326 is formed of PFA or ETFE. In some embodiments, spring-energized seal 312 may be an off-the-shelf seal. In one embodiment, spring 324 and jacket 326 are formed of materials that already would be wetted in a standard RTJ type, HP magmeter with a fluoropolymer liner. FIG. 10 also shows pathway 328 that is formed in fluoropolymer cavity 310 to open to spring-energized seal 312. Process fluid in pathway 328 causes spring 324 to bear against jacket 326 to press jacket 326 into adjacent walls thereby creating a seal.

Figure 11:
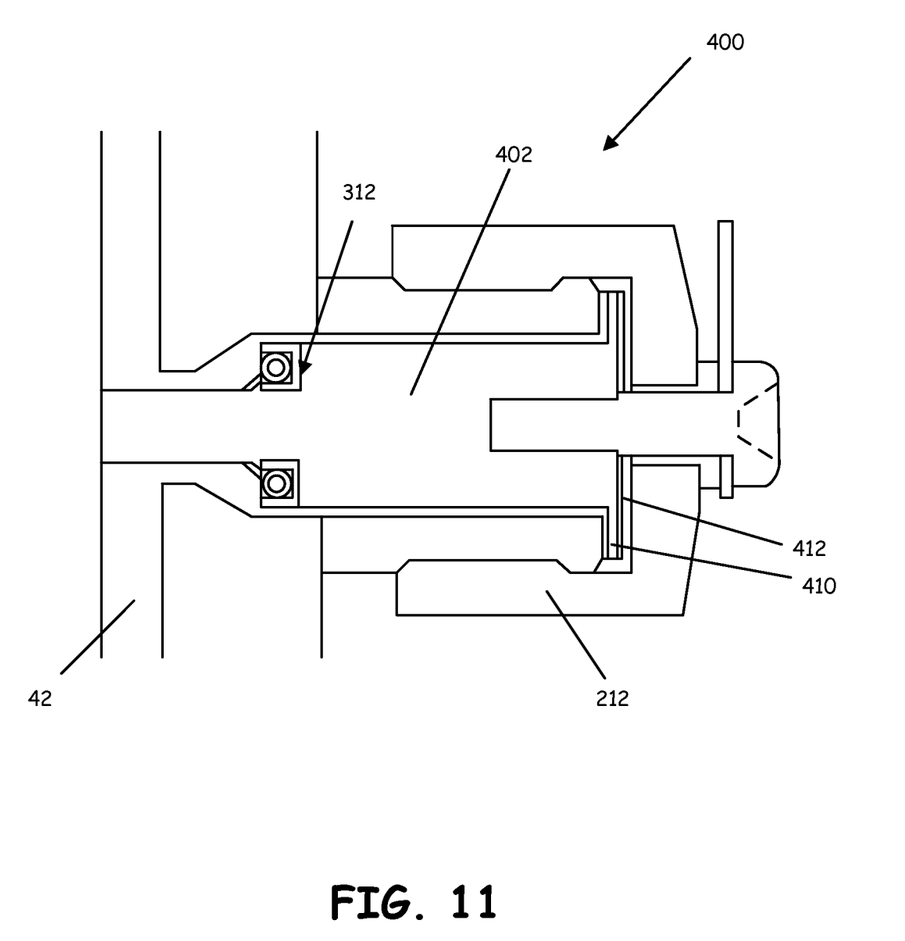
FIG. 11 is a diagrammatic view of an electrode assembly in accordance with another embodiment of the present invention.

FIG. 11 is a diagrammatic view of an electrode assembly in accordance with another embodiment of the present invention. Electrode assembly 400 bear a number of similarities to electrode assembly 300 and like components are numbered similarly. Electrode assembly 400 still employs a spring-energized seal 312. However, electrode extension 403 of electrode assembly 400 has a flared portion 410. Additionally, an isolative washer 412 is disposed between flared portion 410 and nut 212. Flared portion 410 and isolative washer 412 help prevent over-torqueing of the assembly when nut 212 is tightened.

Figure 12:
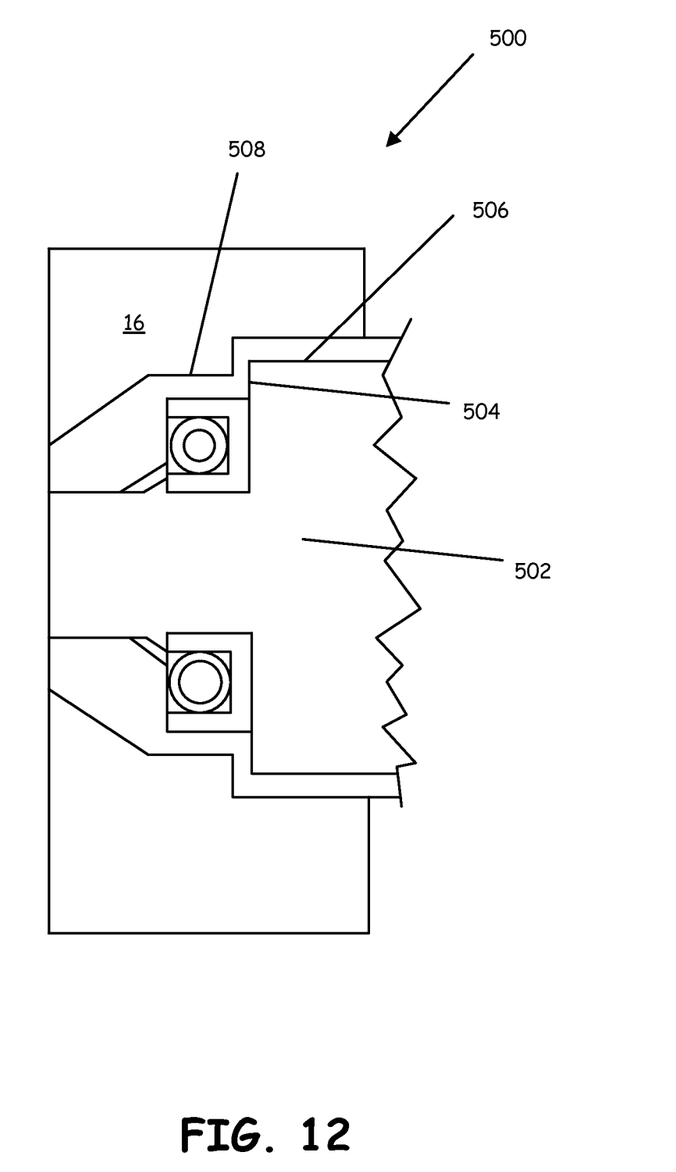
FIG. 12 is an enlarged diagrammatic view of a portion of the electrode assembly in accordance with another embodiment of the present invention.

FIG. 12 is an enlarged diagrammatic view of a portion of an electrode assembly in accordance with another embodiment of the present invention. In the embodiment illustrated in FIG. 12, electrode assembly 500 includes an electrode extension 502 that has a shoulder 504 that has an outer diameter 506 that is larger than inner diameter 508 in the wall of conduit 16. Thus, shoulder 504 acts as a compression limiter at spring-energized seal 312.

Although the present invention has been described with reference to preferred embodiments, workers skilled in the art will recognize that changes may be made in form and detail without departing from the spirit and scope of the invention.

What is claimed is:
1. A magnetic flowmeter flowtube assembly comprising:
a conduit having a first end and a second end;
a first neck flange coupled to the first end, the first neck flange having a first inside diameter with a first notch extending radially outwardly from the inside diameter, the first notch comprising a first interior surface, the first interior surface comprising a first surface opposing a second surface, wherein the first and second surfaces are angled with respect to each other;
a second neck flange coupled to the second end, the second neck flange having an inside diameter with a second notch extending radially outwardly therefrom, the second notch comprising a second interior surface, the second interior surface comprising a third surface opposing a fourth surface, wherein the third and fourth surfaces are angled with respect to each other;

a fluoropolymer liner disposed within and extending through the first neck flange, the conduit and the second neck flange;

a pair of electrodes mounted relative to the liner to measure a voltage induced within a process fluid flowing through the liner;

a first spring-energized seal ring disposed in the first notch, the first spring-energized seal ring comprising a first face configured to abut the first interior surface; and a second spring-energized seal ring disposed in the second notch, the second spring-energized seal ring comprising a second face configured to abut the second interior surface.

2. The magnetic flowmeter flowtube assembly of claim 1, wherein the first spring-energized seal is constructed, at least in part, from the same material as the fluoropolymer liner.

3. The magnetic flowmeter flowtube assembly of claim 1, wherein the first spring-energized seal includes a spring that is constructed from the same material as the first neck flange.

4. The magnetic flowmeter flowtube assembly of claim 1, wherein the first spring-energized seal includes a spring that is constructed from the same material as the pair of electrodes.

5. The magnetic flowmeter flowtube assembly of claim 1, wherein the first surface is substantially perpendicular to an axis of the conduit.

6. The magnetic flowmeter flowtube assembly of claim 5, wherein the first notch also includes an outer surface that meets the first surface at a substantially right angle.

7. The magnetic flowmeter flowtube assembly of claim 6, wherein the second surface comprises an angled surface opposing the first surface, such that the notch is configured to facilitate insertion of the first spring-energized seal.

8. The magnetic flowmeter flowtube assembly of claim 1, wherein the first spring-energized seal includes a chamfered spring.

9. The magnetic flowmeter flowtube assembly of claim 1, wherein the first spring-energized seal includes an opening facing a mounting face of the first neck flange.

10. The magnetic flowmeter flowtube assembly of claim 9, wherein the second spring-energized seal includes an opening facing a mounting face of the second neck flange.

11. The magnetic flowmeter flowtube assembly of claim 1, and further comprising at least one coil disposed to generate an electromagnetic field relative to process fluid flowing through the liner.

12. The magnetic flowmeter flowtube assembly of claim 11, and further comprising transmitter electronics coupled to the pair of electrodes and the at least one coil.

13. The magnetic flowmeter flowtube assembly of claim 1, wherein the fluoropolymer liner undergoes cold flow with pressure changes.

14. The magnetic flowmeter flowtube assembly of claim 13, wherein fluoropolymer is polytetrafluoroethylene (PTFE).

15. The magnetic flowmeter flowtube assembly of claim 1, wherein the first neck flange is a first weld neck flange.

16. The magnetic flowmeter flowtube assembly of claim 1, wherein the second neck flange is a second weld neck flange.

17. The magnetic flowmeter flowtube assembly of claim 1, wherein at least one of the electrodes includes a spring-energized seal.

18. The magnetic flowmeter flowtube assembly of claim 17, wherein each of the electrodes includes a spring-energized seal.

19. A method of sealing a magnetic flowmeter having a fluoropolymer liner, the method comprising:

providing a flowtube assembly having a pair of neck flanges, each neck flange having an inside diameter with a notch extending radially outwardly therefrom;

inserting a spring-energized seal into each notch, wherein each notch is configured to provide a robust seat for receiving the spring-energized seal; and inserting a fluoropolymer liner into the flowtube assembly after insertion of the spring-energized seals.

20. The method of claim 19 and further comprising chemically bonding the fluoropolymer liner to the flowtube assembly.

21. The method of claim 20, wherein the fluoropolymer liner is chemically bonded to the flowtube assembly at flared portions extending axially from each of the neck flanges.

22. The method of claim 19, wherein the spring-energized seals are selected to have a material in common with at least one of the neck flanges.

23. The method of claim 19, wherein the spring-energized seals are selected to have a material in common with the fluoropolymer liner.

24. A magnetic flowmeter flowtube assembly comprising:

a flowtube configured to receive a flow of process fluid, the flowtube including a first neck flange, a conduit, and a second neck flange;

a fluoropolymer liner disposed within and extending through the flowtube;

a plurality of electrodes disposed to measure a voltage induced within the process fluid;

a first spring-energized seal interposed between the liner and the flowtube in a first notch within the first neck flange, the first notch being configured to provide a robust seat for receiving the first spring-energized seal;

a second spring-energized seal interposed between the liner and the flowtube in a second notch within the second neck flange, the second notch being configured to provide a robust seat for receiving the second spring-energized seal; and wherein the first and second spring-energized seals are disposed on opposite sides, relative to process fluid flow (upstream/downstream), of the plurality of electrodes.

* * * * *